United States Patent [19]

Strickland

[11] 4,321,982

[45] Mar. 30, 1982

[54] TREE CLIMBING-HUNTING AND GAME CART DEVICE

[76] Inventor: Robert E. Strickland, 2702 Dakota Ave., Flint, Mich. 48506

[21] Appl. No.: 162,012

[22] Filed: Jun. 23, 1980

[51] Int. Cl.³ .......................... A01M 31/02; A47C 9/10
[52] U.S. Cl. ........................................ 182/20; 182/134; 182/187
[58] Field of Search .................. 182/20, 133, 134, 135, 182/136, 187; 108/151

[56] References Cited

U.S. PATENT DOCUMENTS

| | | | |
|---|---|---|---|
| 1,187,078 | 6/1916 | May | 182/187 |
| 2,991,842 | 7/1961 | Hardin | 182/187 |
| 3,282,375 | 11/1966 | Ray | 182/20 |
| 3,338,332 | 8/1967 | Brantly | 108/151 |
| 3,352,379 | 11/1967 | Rigg | 182/20 |
| 3,460,649 | 8/1969 | Baker | 182/134 |
| 3,885,649 | 5/1975 | Damron | 182/187 |
| 3,954,155 | 5/1976 | Guidara | 182/20 |
| 3,960,240 | 6/1976 | Cotton | 182/20 |
| 4,009,762 | 3/1977 | Bjerkgard | 182/20 |
| 4,148,376 | 4/1979 | Campbell | 182/20 |

*Primary Examiner*—Reinaldo P. Machado
*Attorney, Agent, or Firm*—Harry R. Dumont

[57] ABSTRACT

A platform is used to climb a tree to an elevated position. A means is connected to the platform to latch it in a secure position so that a hunter may sit or stand on the platform in a hunting position. In a second use of the device, a forward v-shaped tree gripping portion of the platform is flipped over and carries a pair of wheels at one end thus to provide a wheeled platform and cart arrangement for removing game from the forest.

9 Claims, 5 Drawing Figures

TREE CLIMBING-HUNTING AND GAME CART DEVICE

BACKGROUND OF THE INVENTION

This invention relates to game hunting and more particularly to a new and improved platform to be attached to the trunk of a tree at a point well above the ground and near a trail usually followed by game on their way to water, feeding grounds and the like. It is thus possible for a hunter to wait in comparative comfort for the animal to approach. It has been found that the chances of the hunter being scented or sighted by the animal are much greater if the hunter is on the ground and on the same level with the animal.

A further problem arises in transporting game once it has been shot. If the game is deer for example, the game is both bulky and heavy and difficult either to drag or carry through the underbrush. The present invention provides for a hunting platform that is readily convertible by simple flip-over of one part and reattachment of another to a wheel-carrying cart so that the game can be much more easily transported from the forest by a single hunter.

It is also important that the platform device which is especially adapted but not exclusively for use by sportsmen makes a relatively thin, flat and compact package of small weight. Thus when not in use it can be easily stowed in a bag or elsewhere or otherwise carried in the field.

It is further important that the platform and its mounting components have an adjustable stability so that it is possible to encircle posts or trees of different diameters and so that quick and easy mounting of the device can be made on tree trunks, fence posts, utility poles, camp poles, pier piles and the like wherever needed.

DESCRIPTION OF THE PRIOR ART

Other devices are known which have been designed and used for tree climbing platforms. Among these are U.S. Pat. No. 3,460,649 issued to J. E. Baker et al for "Tree Climbing-Hunting Platform" on Aug. 12, 1969. This patent discloses a platform also adapted to be raised by the feet of the hunter. For its climbing and fastening operation it requires two v-shaped blades used to embrace the tree at different elevations on different sides. This patent does not disclose a simple operating mechanism to securely attach the platform to the tree in its elevated condition. Nor does it disclose a mechanism to allow for quick conversion of the platform into a game transporting cart.

U.S. Pat. No. 1,187,078 issued on June 18, 1916 to S. S. May for "Portable Pole Platform". This patent discloses a tree climbing platform in which the tree trunk is held between spikes at the forward edge of the platform and a cross bar circling around the tree trunk at its opposite side.

U.S. Pat. No. 2,991,842 issued on July 11, 1961 to W. A. Hardin for "Portable Seat Or The Lile". This patent discloses a tree climbing seat which is fastened between a chain loop at the far side of the tree trunk and an oval cut-out portion formed at the forward edge of the seat on the near side of the trunk. Again, no provision is made for secure attachment of the platform to the tree in the elevated position nor for conversion of the platform to a game carrying cart.

U.S. Pat. No. 3,338,332 issued on Aug. 29, 1967 to H. W. Brantly, Sr. for "Deer Stands" shows an elevated platform in which the tree trunk is held between a bracing element of an arcuate shape at the front of the platform and a second holding clamp pivotally attached to the platform for encircling the rear of the tree trunk. None of the above-referred to prior art shows a hunter's tree stand having a dual function and easily convertible to a game moving cart.

BRIEF DESCRIPTION OF THE DRAWINGS

The advantages and objects of the present invention will now be explained with respect to the accompanying specification and to the drawings in which like numerals are used to refer to like parts of the apparatus as they may appear in the several different drawing figures and wherein.

DETAILED DESCRIPTION OF THE PREFERRED EMBODIMENT

Figure 1:
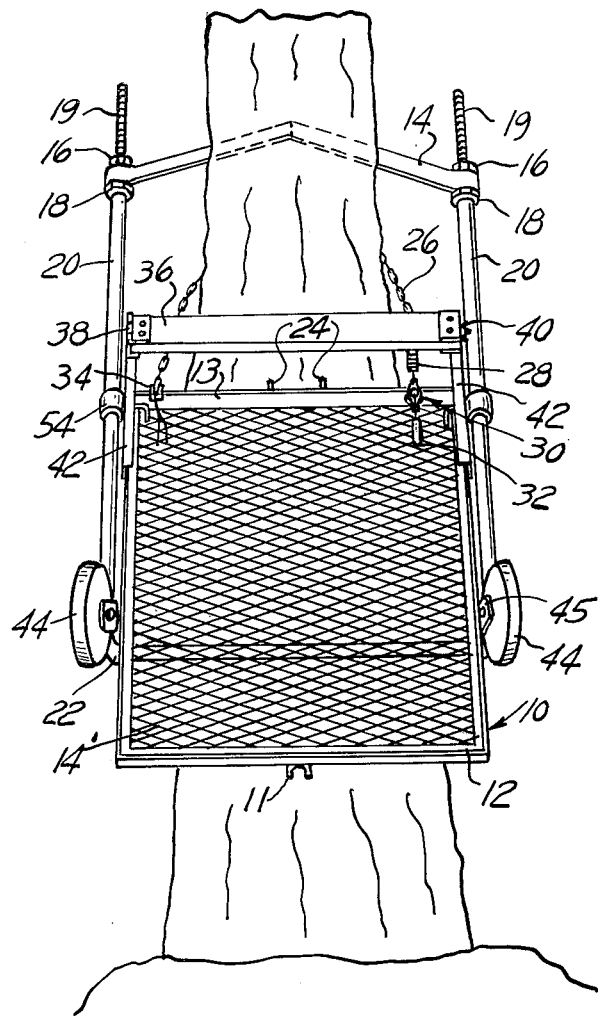
FIG. 1 is a perspective view showing the platform fastened to a tree trunk in an elevated position.

With reference to FIG. 1, it will be seen that the tree climber includes a platform 10 which may be formed of any wooden or metal construction. A "U" shaped bow holder 11 is included at the rear end of the platform. In order to reduce the overall weight, platform 10 is shown embodied as a frame 12 with a metal woven mesh 14' mounted inside the frame. Also included in the device is a tree climbing v-type member 14 which is adjustable to accommodate different diameter tree trunks between it and the forward frame member 13 of the frame 12. To permit for this adjustment, limit and adjusting nuts 16 and 18 are used to move the v-shaped portion 14 toward or away from the forward frame member 13. This is accomplished by threading the nuts forwardly or backwardly on a pair of threaded shafts 19 at either side of the mounting provided for the v-shaped portion 14. The threaded shafts 19 engage internally threaded portions of a pair of tubes 20. In this manner it is possible to remove one of the threaded shafts 19 and then to flip the v-shaped portion out of the way thus to enclose the trunk between it and the platform 10. Once adjustment is made and the trunk is placed between the forward frame member 13 and v-portion 14, the shafts 19 are replaced and the nuts 16, 18 tightened. Tubes 20 will also be seen to terminate in a bend portion 22 which is pivotally attached to the frame 12 through a pin or other type device as better shown in FIG. 2. Thus, it will be seen that flip-over can be made of the mechanism including tubes 20 and v-shaped portion 14 so that these may be used as a handle and steering member for the device when it is placed in its game carrying or cart position. The last mentioned position is best shown in FIG. 2.

Figure 2:
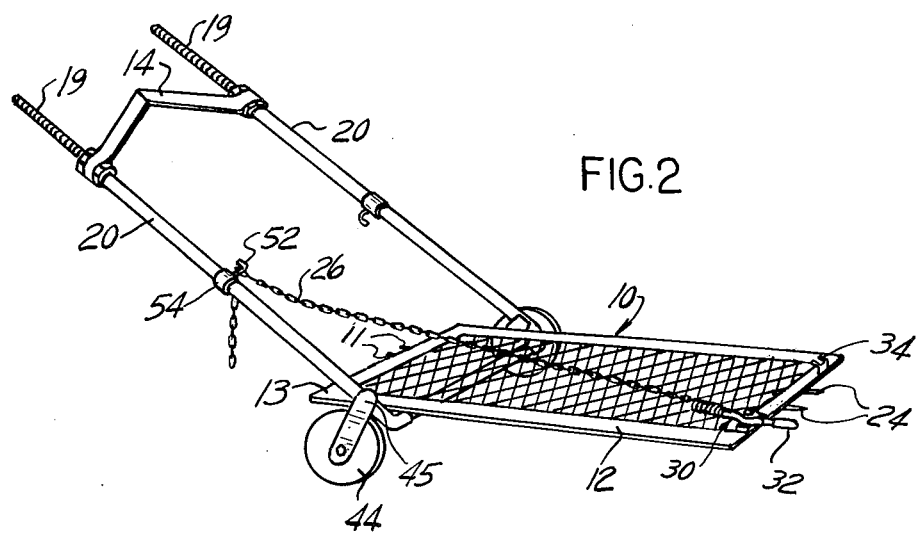
FIG. 2 is a perspective view of the device showing its conversion to a game carrying cart.

Also shown in FIGS. 1 and 2 are a pair of spikes 24 which extend laterally from the forward frame member 13 of the platform 10 thus to further secure the platform 10 and position it on the tree trunk once it has been placed in the elevated tree climbing position. FIG. 1 also shows a chain attaching mechanism used to securely fasten the platform 10 in its elevated position on the tree trunk. Included in this attachment mechanism are chain 26, a heavy coil spring 28 and a binder 30 with attached handle 32 which will be better shown and explained in connection with FIGS. 3 and 5 hereinafter. Also shown in FIG. 1 is a v-slotted retainer 34 which is used to attach the left or free end of the chain 26 in its locking position to the front edge of platform 10.

Figure 4:
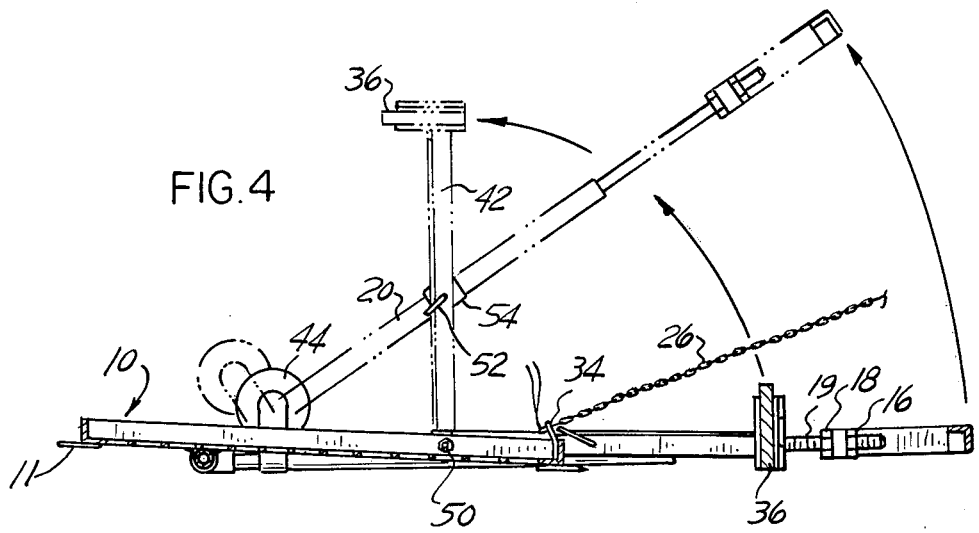
FIG. 4 is a sectional view of the device along the line 4—4 showing the seat portion in its elevated use position with a dot-dash line representation.

Provision is also made on the platform for a seat for the hunter which includes a seat portion 36 having a hinge 38 at its lefthand side. The seat is fastened in a position for use by fastener 40 at the righthand side. A pair of posts 42 are employed to support the seat portion 36 whether in its raised, used position or in its flattened, carrying position. It will be understood that the seat portion 36 is generally left unlatched and flipped leftwardly so that it will be out of the way when the hunter is climbing the tree. The climbing is done with the hunter's feet interposed in the triangular spaces left between the tubes 20 and either side of the platform 10 as best shown in FIG. 4.

Figure 3:
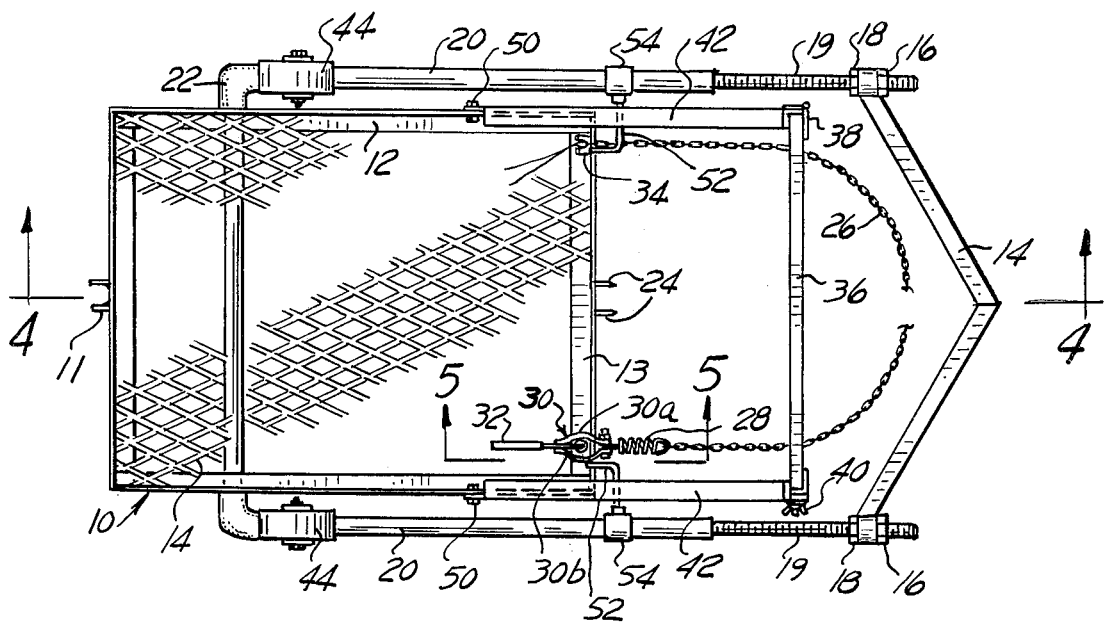
FIG. 3 is a top plan view of the device in a folded position.
Figure 5:
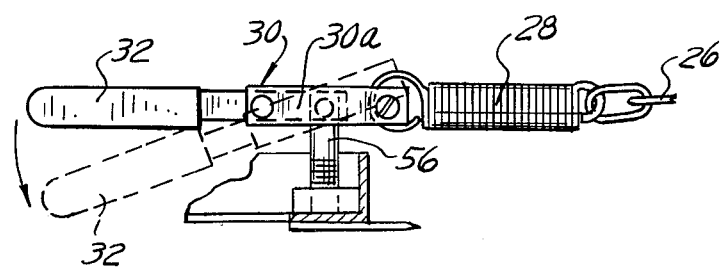
FIG. 5 is an enlarged side view of the binder taken along line 5—5 of FIG. 3 and used to tighten the chain about the trunk of the tree.

FIGS. 1 and 3 show how the pair of wheels 44 are rotatively attached at opposite sides of the bend tube portion 22. FIGS. 3 and 4 show the manner in which the support posts 42 for the seat portion 36 are pivotally supported at their lower ends to opposite sides of the side frame members 12 by threaded connectors 50 respectively. As best shown in FIG. 4, each of the side portions 42 carrying the seat 36 is pinned by a stud 52 to a sleeve 54 which is journaled about one of the tubes 20. Thus, as the seat 36 is pivoted leftwardly in an arcuate manner with respect to FIG. 4, the associated sleeve 54 slides up or down the tube 20, at the same time tilting the v-shaped portion 14 so that it is in a slightly raised position with respect to the platform 10. This as already stated allows for the climber to insert his foot in the v-shaped opening at either side to raise the platform 10 upwardly step by step into its final elevated position. Also shown in FIGS. 3 and 5, is the detail of the binder 30 which is mounted between a pair of opposed members 30a and 30b. The actuating handle for the binder 30 is identified by the numeral 32. When the platform 10 has been placed in its elevated position, the chain 26 is then wrapped around the same side of the trunk as the v-shaped portion 14 and dropped into the upwardly oriented slot of the retainer slot 34. In order to tighten the chain 26 about the tree trunk and thus retain the chain end from being dislodged from the locking slot, the handle 32 is pressed downwardly horizontal as shown in FIG. 5 thus raising slightly its right end portion and providing tension on the coil spring 28 and therefore on the chain 26. It will further be seen that the binder mechanism is pivotally adjusted on a swivelable vertical post 56 as best shown in FIG. 5 with the post located between the side members 30a and 30b. This permits rotation of the entire binder device 30 from its tree attachment position as shown in FIG. 5 to its position in a carrying or cart condition as shown in FIG. 2. This makes possible the ready convertibility of the platform from tree climbing to game carting use. Also by the incorporation of the spring 28 in the combination, there is provied gradual application of pressure through tightening of the binder 30 so that none of the chain parts or connected elements are broken by abrupt actuation of the binder.

It will now be seen that the conversion of the climbing platform to a cart is made by pivotal movement of the v-shaped portion 14 and its supporting structure about the pivotal mounting on the platform 10. In order to strengthen the cart for use, the binder 32 is then pivoted substantially 180° and the chain 26 end is then fastened to one of the pin connectors 52 shown in FIG. 2. Portions of the seat and its associated mechanism have been omitted from the FIG. 2 drawing in order to clarify the operation of the parts which contribute to the conversion to cart operation.

It will thus be seen that I have provided by my invention a novel and improved tree climber structure to render it easy to use and securely lockable in place. I have further provided a tree climbing platform that by its arrangement of parts can be readily convertible by simple manipulation to a cart operation for removal of game and the like.

I claim:

1. A tree climbing and game carting platform, comprising:
   a platform elevatable to a raised position on a tree trunk;
   a v-shaped portion forwardly mounted on said platform for engaging said trunk about its further side; and a secure attachment means mounted on the edge of said platform proximate said trunk and also engagable about its further side said attachment means comprising a chain, a tension applying means coupled between one end of said chain and said platform edge, and a retainer for holding the other end of said chain to said edge, said v-shaped portion including a pair of wheels mounted on it and pivotably mounted on said platform for movement intermediate a forward trunk gripping position and a rearward came carting position.

2. The combination as set forth in claim 1 where in a plurality of spikes are mounted forwardly on said platform for further gripping the trunk in the raised position of the platform.

3. The combination as set forth in claim 1 wherein said platform includes a metal frame and an intermediate mesh portion.

4. The combination as set forth in claim 1 wherein said attachment means includes a spring means connected intermediate said chain and said tension applying means.

5. The combination as set forth in claim 1 wherein said tension applying means comprises an over-center type lever pivotally mounted on said platform.

6. The combination as set forth in claim 1 wherein said retainer for said chain comprises a v-slotted plate fixed to said edge.

7. The combination as set forth in claim 1 wherein a seat portion is pivotally mounted on said platform for movement between a flat storage position against said platform and a raised operative position spaced from said platform.

8. The combination as set forth in claim 7 wherein said seat portion includes a pair of legs and a sleeve connected to each of said legs and slidably mounted on opposed tube portions of said v-shaped portion.

9. The combination as set forth in claim 5 wherein said lever is rotatably mounted on said platform and movable substantially 180° between a tree-climbing position and a carting position in which said chain other end is disconnected from said retainer and connected to said v-shaped portion.

* * * * *